US005678831A

United States Patent [19]

Nakamura

[11] Patent Number: 5,678,831

[45] Date of Patent: Oct. 21, 1997

[54] SEALING DEVICE OF COMPARTMENT GATEWAYS OF CONTINUOUS ANNEALING FURNACES AND CONTINUOUS PAINTING EQUIPMENTS

[75] Inventor: Teruhisa Nakamura, Shin Nanyo, Japan

[73] Assignee: Nisshin Steel Co., Ltd., Tokyo, Japan

[21] Appl. No.: 491,891

[22] PCT Filed: Dec. 14, 1994

[86] PCT No.: PCT/JP94/02100

§ 371 Date: Jul. 14, 1995

§ 102(e) Date: Jul. 14, 1995

[87] PCT Pub. No.: WO95/16888

PCT Pub. Date: Jun. 22, 1995

[30] Foreign Application Priority Data

| | | | |
|---|---|---|---|
| Dec. 15, 1993 | [JP] | Japan | 5-342181 |
| Oct. 28, 1994 | [JP] | Japan | 6-287182 |

[51] Int. Cl.$^{6}$ .............................. F16J 15/32; F16J 15/46

[52] U.S. Cl. ..................... 277/227; 277/901; 277/DIG. 7

[58] Field of Search .................................... 277/227, 901, 277/DIG. 6, DIG. 7; 174/356 C; 118/733, 419, 420; 266/271

[56] References Cited

U.S. PATENT DOCUMENTS

| | | | |
|---|---|---|---|
| 2,084,523 | 6/1937 | Crawford | 174/35 GC |
| 4,107,129 | 8/1978 | Tanaka et al. . | |
| 4,207,376 | 6/1980 | Nagayasu et al. . | |
| 4,336,028 | 6/1982 | Tomibe et al. . | |
| 4,398,728 | 8/1983 | Sukegawa et al. | 277/DIG. 7 |
| 4,699,804 | 10/1987 | Miyata et al. . | |
| 4,980,516 | 12/1990 | Nakagawa | 174/35 GC |

FOREIGN PATENT DOCUMENTS

| | | |
|---|---|---|
| 214134 | 9/1987 | Japan . |
| 287020 | 12/1987 | Japan . |
| 36999 | 2/1992 | Japan . |

*Primary Examiner*—Scott Cummings
*Attorney, Agent, or Firm*—Kanesaka & Takeuchi

[57] ABSTRACT

A danger of explosions or fires caused by a spark of static electricity in sealing portions of compartment gateways of continuous annealing furnaces to perform bright annealing or oxidation-free annealing of metal strips, continuous painting equipments, and the like wherein a flammable atmospheric gas having a danger of explosions or fires is used, is prevented, and the formation of abrasions or scratches on the strip surface is prevented. In the sealing portions of the gateways, an elastic pad (17) including an electroconductive non-woven fabric having carbon-containing fibers, fibers having chemically formed polypyrrole as electron-conjugated electroconductive polymer, fibers made by treating acrylic fibers with a divalent copper compound and a sulfur-containing compound alone, or fibers having these fibers as the major component, provided on a surface of a sealing hardware (16), a surface of which has an electrical resistivity value of from $10^{-3}$ to $10^{6}$ Ω·cm, and an elastic rotary roll (18) pressed respectively against a metal strip (1) and said elastic pad (17) are provided in combination.

6 Claims, 6 Drawing Sheets

SEALING DEVICE OF COMPARTMENT GATEWAYS OF CONTINUOUS ANNEALING FURNACES AND CONTINUOUS PAINTING EQUIPMENTS

TECHNICAL FIELD

The present invention relates to a sealing device of compartment gateways of continuous annealing furnaces, continuous painting equipments, and the like for preventing a danger of explosions or fires caused by a spark of static electricity in sealing portions of compartment gateways of continuous annealing furnaces, continuous painting equipments, and the like to perform bright annealing or oxidation-free annealing of metal strips such as stainless steel strips, silicon steel strips, aluminum strips, brass strips, and copper strips, wherein a flammable atmospheric gas having a danger of explosions or fires is used.

BACK GROUND OF THE INVENTION

Bright annealing furnaces or oxidation-free annealing furnaces to perform continuous annealing of metal strips such as stainless steel strips, silicon steel strips, aluminum strips, brass strips, and copper strips, when the case of a vertical furnace is concerned, have a structure wherein a metal strip (hereinafter sometimes referred to as "strip") to be annealed comes into the furnace from a lower portion of the furnace, goes inside the furnace and comes out again from the lower portion of the furnace. In such furnaces, in order to prevent the oxidation of the strip, a flammable gas having a danger of explosions or fires, such as, for example, a hydrogen gas-containing mixed gas, is used.

Also, in contiuous painting equipments, an organic solvent having a danger of explosions or fires in painting compartments of the metal strip is used.

In portions of inlets or outlets through which strips and the like pass, in compartments of these continuous annealing furnaces, continuous painting equipments, and the like, wherein a flammable gas having a danger of explosions or fires is used, devices for isolating (hereinafter sometimes referred to as "sealing") the compartment atmosphere from the outside of it by means of a pad comprising a wool felt only or a wool felt having a polyester fiber- or acrylic fiber-made felt laminated on the surface thereof, or the like (the pad being hereinafter referred to as "elastic pad") have been commonly employed.

The conventionally used general bright annealing furnace of a stainless steel strip will be hereunder explained.

FIG. 2 is a drawing to explain the structure of a conventionally used bright annealing furnace of a stainless steel strip, wherein a strip 1 passes through an inlet sealing portion 5 via a roll 4, comes into a furnace body 2, and passes again through an outlet sealing portion 6 when it comes out. In the furnace body 2, a furnace atmospheric gas 7 containing a hydrogen gas is always introduced, the furnace pressure is kept at a gauge pressure of from about 10 to 50 $mmH_2O$ (water column), and the furnace atmospheric gas leaks out little by little from the inlet sealing portion 5 and outlet sealing portion 6.

FIG. 3 is an enlarged front sectional view of one example of the conventionally used outlet sealing portion 6, wherein each elastic pad 13 is sandwiched between a metallic roll 11 and a sealing hardware 12. This elastic pad 13 is drawn by the friction with the strip 1, the metallic roll 11 is provided with a detent, and in the case that contaminants or stains are accumulated on the elastic pad 13, the detent is removed so that the roll 11 is rotated. That is, the metallic roll 11 does not rotate except when a clean portion of the elastic pad 13 is brought into contact with the strip 1. This structure will be further explained with reference to FIG. 4 which is a front view of FIG. 3 as well as FIG. 5 which is a side view of FIG. 4. Each lever 9 is tightly fixed to a pivot pin 10 acting as a rotation center, a nose portion of which is installed with a bearing 15 supporting a roll axis 14 of the metallic roll 11, but a heel portion of which is applied with an actuating force of a cylinder 8. The two metallic rolls 11 press the respective elastic pads 13 to the strip 1 passing between the rolls 11 and simultaneously push them against the sealing hardwares 12, to thereby isolate the inside of the furnace body 2 from the outside of it and seal the furnace atmospheric gas 7. This elastic pad 13 has a wider width than the strip 1 so that in the edge portion in the width direction of the strip 1, the formation of a gap corresponding to the thickness of the strip 1 by the elasticity of the elastic pad 13 can be prevented. However, in the outside of the elastic pad 13, an air mixture 20 of the furnace atmospheric gas 7 leaking out from the furnace body 2 through the felt by itself or a small gap and air is present as shown in FIG. 3.

Next, one example of other conventionally used sealing devices will be explained with reference to FIGS. 6, 7 and 8.

FIGS. 6 and 7 show a main portion of the sealing device where the rolls are rotated, and wherein FIG. 6 is a front sectional view of the portion corresponding to FIG. 3, and FIG. 7 is a side view thereof. While since the mechanism of sandwiching the strip 1 by rolls is exactly the same as that described above, the explanation is omitted, rolls 18 as used herein are an elastic rotary roll (hereinafter sometimes simply referred to as "roll"). As the rolls 18, any of rolls formed by forming an elastic material on a rotary axis into a predetermined dimension and shape to form an integral roll, rolls formed by lining an elastic material on the outer periphery of a usual metallic roll barrel to form an integral roll, and rolls by fitting a sleeve comprising an elastic material on the periphery of a usual metallic roll barrel to form an integral roll can be used. In place of the sealing hardwares 12 of the conventionally used sealing device shown in FIGS. 3, 4 and 5, elastic pads 17 are each stuck on the surface of a sealing hardware 16 or fixed thereon by using bolts and nuts, and the above-described rolls 18 are pressed to the strip 1 and elastic pads 17 by an actuating force of the cylinder, to thereby seal the inside of the furnace body 2 from the outside of it.

FIG. 8 is an enlarged sectional view taken along line 8—8 in FIG. 6, wherein a small gap 22 is present between a pair of the rolls 18 in each of the edge portions in the width direction of the strip 1. The furnace atmospheric gas 7 passes through the gaps 22 and elastic pads 17 slightly leaking out, and the furnace atmospheric gas 7 is a very dry gas having a dew point in the vicinity of −50° C. Therefore, the circumference where the air mixture 20 is present is in the state that the static electricity is likely generated. For such a state, not only in the rolls 18, an electrification phenomenon occurs by the deformation, friction, or peeling of the elastic material caused due to the press rotation of the rolls 18 by themselves, but also on the surface thereof, a static electricity of from about ±1,000 V to ±15,000 V is generated by an electrification phenomenon caused by the friction with the elastic pads 17 by the press rotation as the main reason. The voltage of this static electricity tends to be particularly high, in the case that the thickness of the strip 1 is thick, and that in order to prevent the formation of a gap in the portion where each of the rolls 18 is not in contact with the strip 1, the actuating force of the cylinder is increased in order to increase the press force and make the rolls 18 closely contact with each other, that the press force between the elastic pad 17 and the roll 18 is increased, or that the rotation speed of the rolls 18 is increased. Since the strip 1 is present in an equipment where earth 3 of a winder, a rewinder, etc. are provided (see FIG. 2), and the rolls 18 always contact with the strip 1, the earth 3 should be indirectly provided, but it is the present state that the electrification potential of the rolls 18 does not decrease. Thus, even though it is attempted to bring the rolls 18 into contact with an electric conductor such as a metallic brush,. a metallic roll etc. and eliminate the static electricity charged on the rolls 18, it is difficult to always decrease the electrification potential to a level at which the ignition of the air mixture 20 comprising the hydrogen gas-containing furnace atmospheric gas 7 in the whole periphery of the roll 18 is prevented (the level being generally considered to be ±1,000 V), since the rolls 18 are deformed and rubbed at every rotation by the contact with the electric conductor so that they are recharged. Since the electroconductivity of the metallic brush or metallic roll is good, the danger of the generation of a spark rather increases, such attempt being not advantageous. Also, since in FIG. 7, the roll 18 is connected to the furnace body 2 via the roll axis 14, bearing 15, and lever 9, the roll 18 should be provided with the earth 3 (see FIG. 2) via a side plate 21 of the furnace body 2. Howerver, the static electricity is charged on the surface of the roll 18, so far as the elastic material forming the outer periphery of the roll barrel of the roll 18 is an electrical insulator, and the static electricity does not leave from the surface of the roll 18.

As described above, in the conventionally used compartment gateways of continuous annealing furnaces, continuous painting equipments, and the like shown in FIGS. 2, 3, 4 and 5, the elastic pad 13 is pressed to the strip 1 by a considerably high pressure for the purposes of thoroughly attaining the sealing purpose of the furnace atmospheric gas 7, and contaminants on the surface of the strip 1 and dusts of the refractories in the compartments drop to adhere to and accumulate on the elastic pad 13 and are rubbed with the strip 1 to likely form abrasions or scratches on the surface of the strip 1. In particular, for stainless steel strips and the like on which importance is attached to the gloss or appearance of the surface, the generated scratches cause fatal surface defects, leading to a lowering in the quality and yield, and hence, such was of problem.

In addition, in another conventionally used sealing device of compartment gateways of contiuous annealing furnaces, continuous painting equipments, and the like shown in FIGS. 6, 7 and 8, an improvement was made in such a manner that the hardness of the elastic material forming the roll barrel of the roll 18 is made low and that an appropriate press force is applied to the rolls 18 so as to form no gap between a pair of the rolls 18 even in the strip edge portions not supporting the strip 1. In this sealing device, since the rolls 18 and the strip 1 are rotated at the same rate, abrasions or scratches are not formed on the surface of the strip 1, and even when contaminants or dusts drop on the surface of the roll 18, the surface of the soft roll 18 becomes dented so that the surface of the strip 1 and furthermore, products produced therefrom are not likely applied with impressions by foreign matters. Further, since a gap is not substantially formed between the rolls 18, the sealing properties are good. However, since for example, an atmospheric gas composed mainly of a hydrogen gas, the dew point of which is decreased to a level in the vicinity of −50° C. In order to prevent the surface oxidation or the coloration by the surface oxidation of the strip 1 and keep the surface glossy, is used as an atmosphere in the continuous bright annealing furnace, the gas slightly leaking out from the sealing portion is very dry. As a result, in the case that rolls produced by using electrical insulating substances such as, for example, silicone rubbers and urethane rubbers as the elastic material are used as the sealing roll 18, a strong static electricity is formed on the surface of the roll 18 by the deformation, friction or peeling of the elastic material caused following the rotation as well as the friction with the elastic pad 13, and the air mixture comprising a hydrogen gas and air as the atmospheric gas is ignited even by a very small amount of energy of about $2\times10^{-5}$ J (joule), the degree of which, however, depends, on the concentration and pressure. Therefore, in this sealing device, there was involved a problem that even when the static electricity charged on the surface of the roll 18 slightly sparks, the air mixture comprising a hydrogen gas and air present in the circumference thereof is ignited.

DISCLOSURE OF THE INVENTION

The present inventor made investigations for the purposes of providing a device which solves the above-described problems of the conventionally used sealing device of compartment gateways of continuous annealing furnaces, continuous painting equipments, and the like shown in FIGS. 6, 7 and 8, has good sealing properties, prevents the formation of abrasions or scratches on the strip surface to thereby improve the surface quality and yield, and which can avoid the explosions and ignition by electrification of a static electricity and fires caused thereby. As a result, it has been found that such purposes can be achieved if in the above-described sealing portions having an improved mode, the electrical resistivity value is decreased to a range of from $10^{-3}$ to $10^{6}$ Ω·cm by using electroconductive fibers alone or an electroconductive non-woven fabric comprising electroconductive fibers as a major component for at least a surface layer of an elastic pad or other means, leading to accomplishment of the present invention.

That is, the present invention relates to a sealing device of compartment gateways of continuous annealing furnaces, continuous painting equipments, and the like, characterized in that in sealing portions of compartment gateways using an atmosphere having a danger of explosions or fires in continuous annealing furnaces, continuous painting equipments, and the like for metal strips, an elastic pad provided on a surface of a sealing hardware, a surface layer of which has an electrical resistivity value of from $10^{-3}$ to $10^{6}$ Ω·cm, and an elastic rotary roll pressed respectively against a metal strip and said elastic pad are provided in combination.

BEST MODE FOR PRACTICING THE INVENTION

Figure 1:
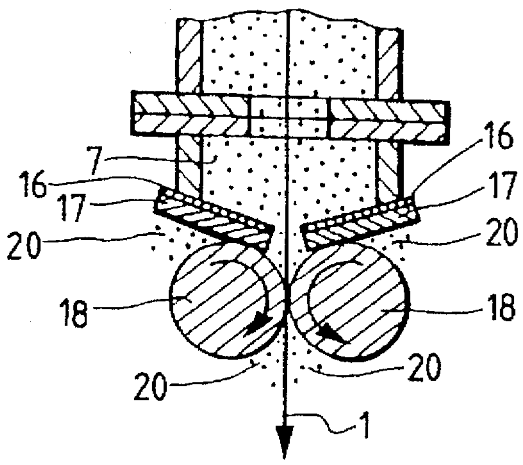
FIG. 1 is a front sectional view to show the, structure of one example of sealing devices of compartment gateways of continuous annealing furnaces, continuous painting equipments, and the like according to the present invention.
Figure 2:
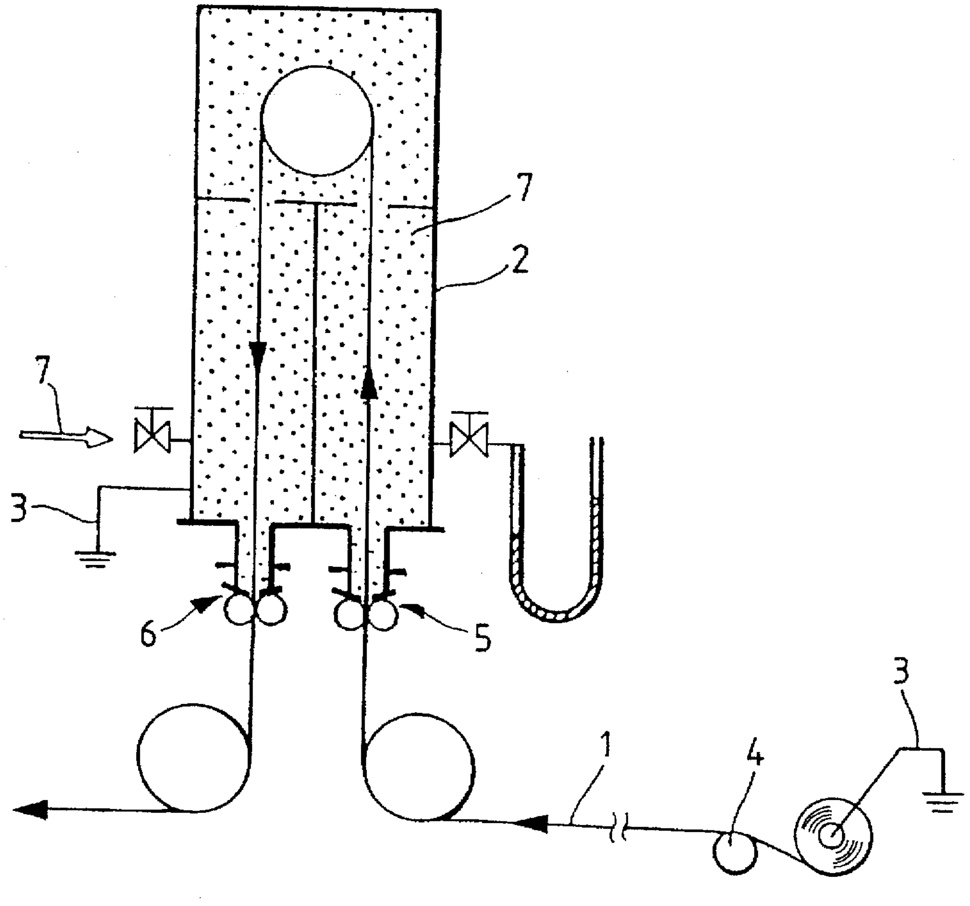
FIG. 2 Prior Art
FIG. 2 is an explanatory side view for showing a conventional annealing furnace.
Figure 3:
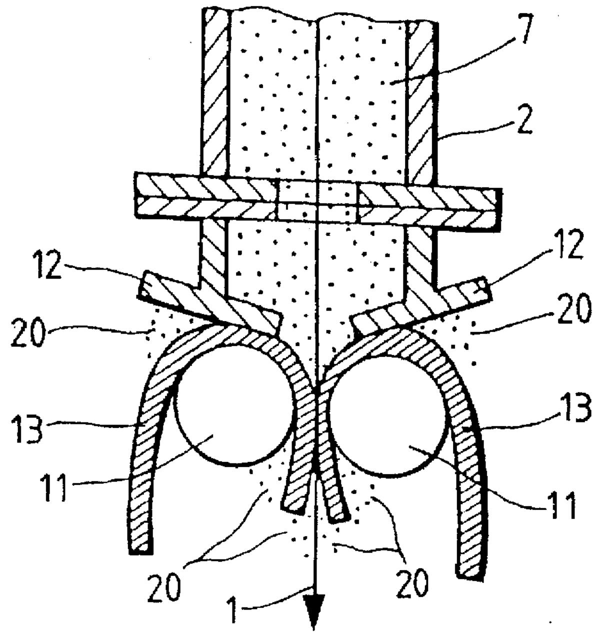
FIG. 3 Prior Art
FIG. 3 is an enlarged front sectional view of an outlet sealing portion of the conventional annealing furnace.
Figure 4:
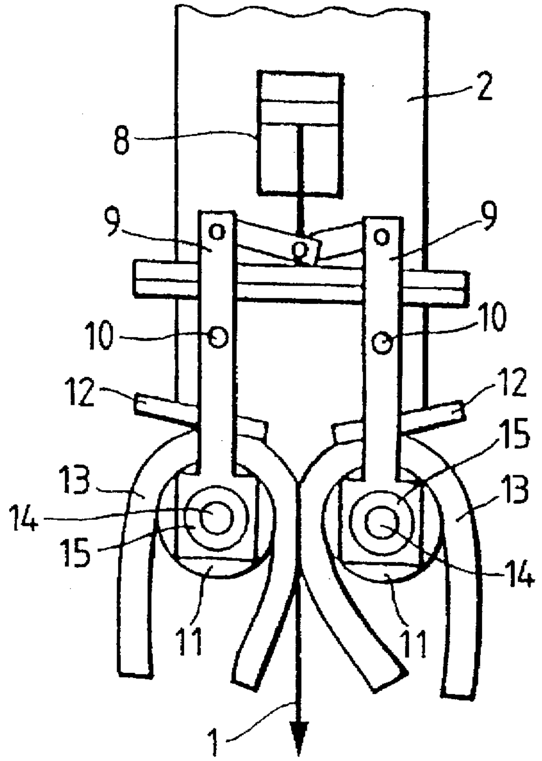
FIG. 4 Prior Art
FIG. 4 is a front view of FIG. 3.
Figure 5:
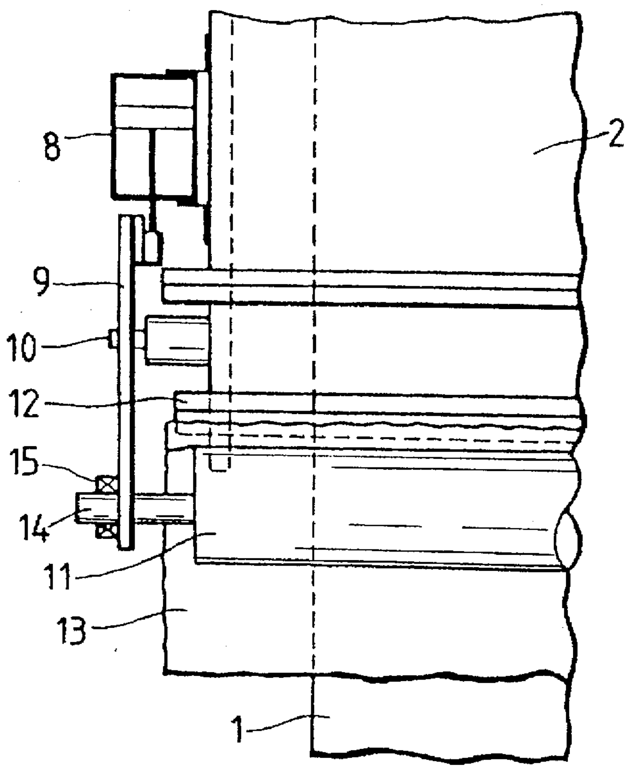
FIG. 5 Prior Art
FIG. 5 is a side view of FIG. 4.
Figure 6:
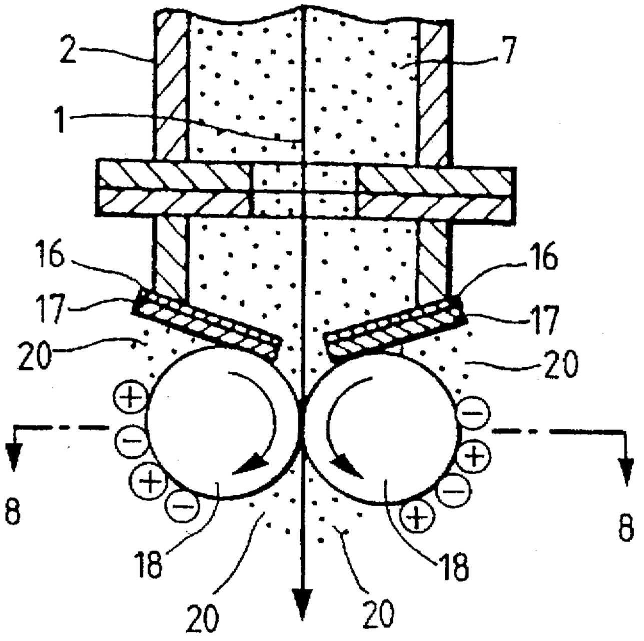
FIG. 6 Prior Art
FIG. 6 is a section view of a main portion of a conventional sealing device.
Figure 7:
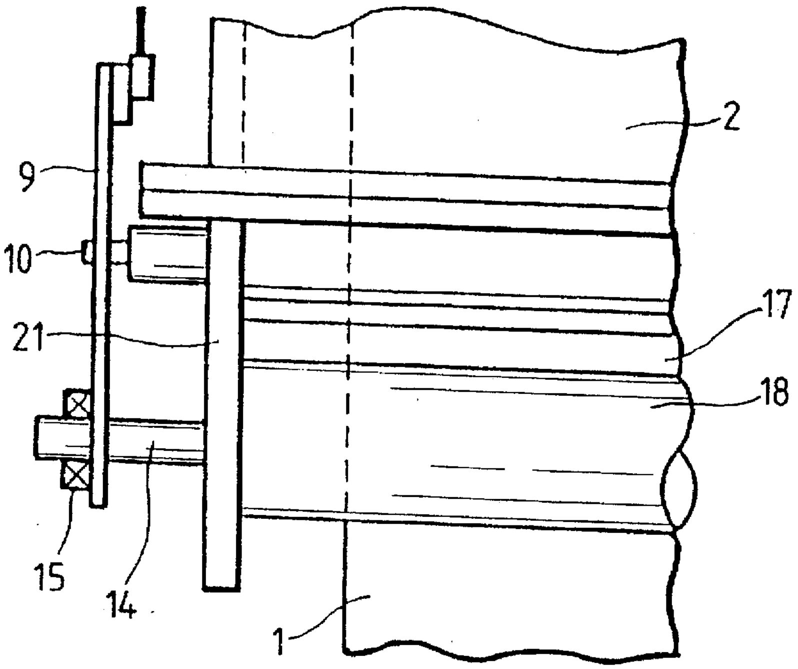
FIG. 7 Prior Art
FIG. 7 is a side view of FIG. 7.
Figure 8:
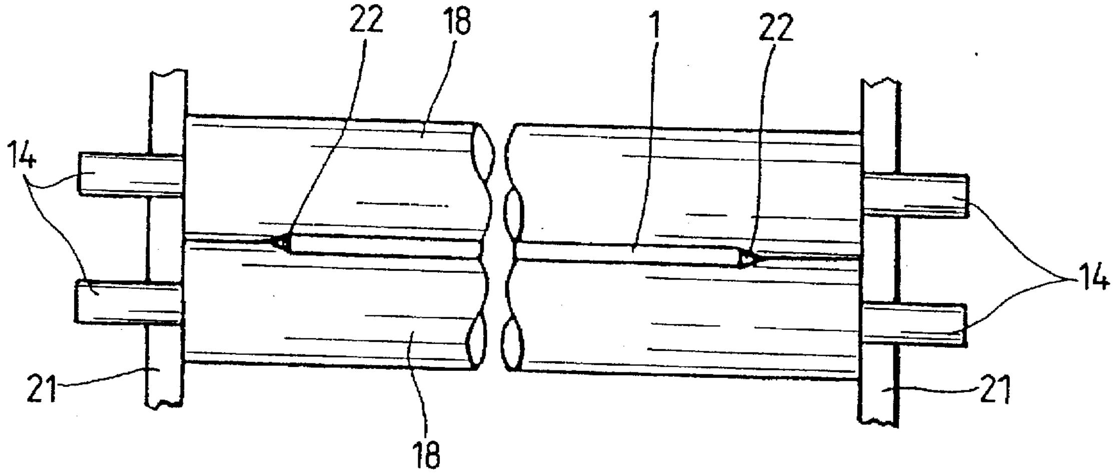
FIG. 8 Prior Art
FIG. 8 is an enlarged section view taken along a line A—A in FIG. 6.

The sealing device in FIG. 1 is the same as the above-described improved sealing device shown in FIGS. 6 and 7 at the points that the elastic rotary rolls 18 are respectively pressed against the strip 1 and the elastic pad 17 provided on the surface of the sealing hardware 16, whereby the inside of the furnace is sealed from the outside of it and that the strip 1 passes between the rolls 18 and comes out into the arrow direction. With respect to the elastic pad 17, there are a case of a single layer of a non-woven fabric, a case that a non-woven fabric is laminated, and a case that a non-woven fabric is provided as a single layer or laminated on the surface of an elastic material such as a sponge rubber layer. In any of these cases, since ones having an electrical resistivity value of from $10^{-3}$ to $10^{6}$ Ω·cm are used as the non-woven fabric of the surface layer, the static electricity which has hitherto been a problem is not generated. Even if a static electricity is generated on the surface of the roll 18, since the static electricity flows into the furnace body 2 provided with the earth 3 shown in FIG. 2 because the surface layer of the elastic pad 17 is electroconductive, the surface of the roll 18 is never charged. Furthermore, even if a non-woven fabric, at least the surface of which is electroconductive, such as the elastic pad 17, has a high electric field strength by the electrification of the roll, as its own properties, it generates a corona discharge with a very small amount of energy because the fibers of the non-woven fabric are fine and hence, it does not cause the ignition source or electrical shock. Therefore, the lower limit of the electrical resistivity value for the purpose of preventing fires or explosions can be decreased as compared with that in the case that the elastic material forming the roll 18 is made of an electroconductive substance. However, if the electroconductivity of the surface layer of the elastic pad 17 is higher than $10^{6}$ Ω·cm in terms of the electrical resistivity value, it is substantially equal to that of insulators so that the electrification is great, and therefore, such is not suitable. If the electrical resistivity value is lower than $10^{-3}$ Ω·cm, since the electroconductivity is good, there is a fear that when a person approaches the elastic pad 17 for the purpose of cleaning or inspection, the static electricity charged in the human body upon the friction of clothes or the like causes a spark discharge from the tip of a finger or the like to the elastic pad 17, and therefore, such is not suitable either.

In addition, since as described above, the elastic pad 17 is adjusted such that the surface layer thereof has an electrical resistivity value of from $10^{-3}$ to $10^{6}$ Ω·cm, the static electricity charged on the surface of the roll 18 flows into the furnace body 2 provided with the earth 3 via the electroconductive elastic pad 17. Accordingly, since the surface of the roll 18 is not charged by a static electricity with a high voltage, there are no particular restrictions with respect to the quality of the elastic material. For example, roll-shaped materials having a predetermined dimension, which are made of any of silicone rubber urethane rubbers, chloroprene rubbers, NBR, EPDM, fluorocarbon rubber or chlorinated polyethylene, those formed by lining with any one of the rubbers material, those formed by fitting a sleeve comprising any one of the rubbers material, those formed by further sticking or providing a non-woven fabric or a woven fabric on such an elastic material, and those formed by sticking or providing a non-woven fabric or a woven fabric on an iron core can be used.

The reasons why in the present invention, the elastic pad 17 is adjusted such that the surface layer thereof has an electrical resistivity value of from $10^{-3}$ to $10^{6}$ Ω·cm will be explained in comparison with the case of using the conventional elastic pad.

(1) Main characteristics of elastic pad and roll used:

TABLE 1

[Main characteristics of elastic pad and roll used]

| | Conventional Example | An Example | Available Range |
|---|---|---|---|
| Quality of roll to be combined | silicone rubber, urethane rubber, chloroprene rubber | silicone rubber | silicone rubber, urethane rubber, chloroprene rubber, NBR, EPDM, fluorocarbon rubber, chlorinated polyethylene |
| Elasticity value of roll to be combined [A value of JIS K6301] | 40° to 90° | 55° | 40° to 90° |
| Electrical, resistivity value of roll [Ω · cm] | $10^{10}$ to $10^{13}$ | $10^{13}$ | 1 to $10^{13}$ |
| Electrical resistivity value of surface layer of elastic pad [Ω · cm] | $10^{13}$ or more | $5.85 \times 10^{-2}$ | $10^{-3}$ to $10^{6}$ |
| Effect for preventing fires | x | ○ | ○ |

(Note: ○ means good effect, x means bad effect)

As shown in Table 1, in the Conventional Example, while the roll has an elasticity value of from 40° to 90° in terms of the A value of JIS K6301 and has a sufficient function as the sealing roll 18, since the electrical resistivity value is so high as $10^{13}$ Ω·cm or more in the surface layer of the elastic pad and from $10^{10}$ to $10^{13}$ Ω·cm in the roll, the effect for preventing fires is inferior. In contrast, it can be understood that in the elastic pad 17 used in the device of the present invention, the effect for preventing fires is superior because the surface layer thereof is adjusted so as to have an electrical resistivity value of from $10^{-3}$ to $10^{6}$ Ω·cm by providing the electroconductive non-woven fabric comprising carbon-containing fibers alone or comprising carbon-containing fibers as a major component on the surface of the sealing hardware 16. In order to make the electrical resistivity value low as described above, in addition to the electroconductive non-woven fabric comprising carbon-containing fibers alone or comprising carbon-containing fibers as a major component, electroconductive non-woven fabric comprising fibers having chemically formed polypyrrole as an electron-conjugated electroconductive polymer alone or comprising fibers having chemically formed polypyrrole as an electron-conjugated electroconductive polymer as a major component, electroconductive non-woven fabrics comprising fibers made by treating acrylic fibers with a divalent copper compound and a sulfur-containing compound (polyacrylonitrile-copper sulfide composite) alone or comprising fibers made by treating acrylic fibers with a divalent copper compound and a sulfur-containing compound (polyacrylonitrile-copper sulfide composite) as a major component, and the like can be used.

In the case that the thickness of the strip 1 to be passed is considerably thin as 1.0 mm or less, when the gap 22 appearing between the rolls 18 upon sandwiching by the rolls 18 is originally small so that it is not necessary to strongly press the rolls, the generation of a static electricity is considerably low, while it depends on the rotation speed of the roll 18.

In the case that the thickness of the strip 1 is comparatively thick as 1.0 mm or more, in order to inhibit the gap appearing between the rolls 18 in the portions not being in contact with the strip 1 to become large due to its thickness, the sandwiching force of the rolls 18 is generally increased. At this time, the deformation, friction or peeling phenomenon of the elastic material occurred following the rotation of the rolls 18 increases, leading to a further increase of the electrification. Even in this case, the effects of the device of the present invention are sufficient. The effects are more secured if as disclosed in Japanese Laid-Open Patent Application No. 62-214134, a roll is made by forming an elastic material such as the above-described silicone rubber, urethane rubber, chloroprene rubber, NBR, EPDM or fluorocarbon rubber, to have carbon or a metallic powder added thereto into a roll shape on a rotary axis or lining it on the outer periphery of a roll barrel. A roll made by further sticking or providing a non-woven fabric having the same elasticity and electrical resistivity value as described above, for example, on a roll having such an elastic material as those described above lined thereon, or a roll made by fixing a non-woven fabric having the same elasticity and electrical resistivity value as described to an iron core and adjusting the electrical resistivity value of from 1 to $10^6$ Ω·cm, is used as the roll 18 in combination, to thereby prevent the electrification from the roll itself.

In addition, the effects are also secured if as disclosed in Japanese Laid-Open Patent Application No. 2-54723, a small-diameter portion corresponding to the range of the strip width is provided in the central portion of the roll barrel to omit the particular need to increase the sandwiching force of the rolls in combination, to thereby decrease the electrification from the roll itself.

Figure 9A:
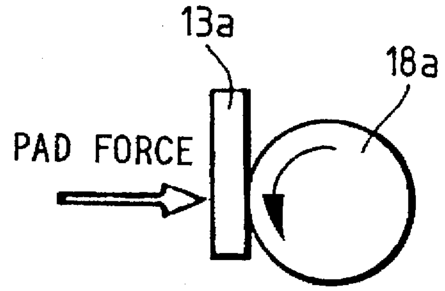
FIGS. 9(A) and 9(B) are side views of experimental device of the invention.
Figure 9B:
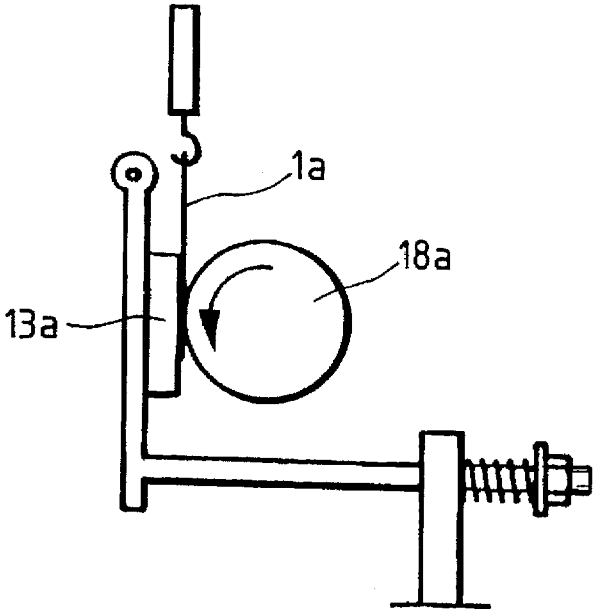

(2) Electrification characteristics:

Since there is a danger of explosions in actual devices, an experimental device shown in FIGS. 9-(A) and 9-(B) and having the same specification and dimension as the actual device was used. A rotating elastic rotary roll **18*a* having a silicone rubber lined thereon was pressed under a normal atmosphere via Sandaron SS-N (a trade name) [made by Don Nelon Co., quality: electroconductive non-woven fabric comprising fibers made by treating acrylic fibers with a divalent copper compound and a sulfur-containing compound as a major component, electrical resistivity value: $5.85\times10^{-2}$ Ω·cm] and Dacron (a trade name) [made by E. I. Du Pont de Nemours and Company, quality: non-woven fabric made of polyester fibers, electrical resistivity value: $10^{13}$ Ω·cm] as an elastic pad 13*a***, and the amount of electrification was adjusted.

Figure 10:
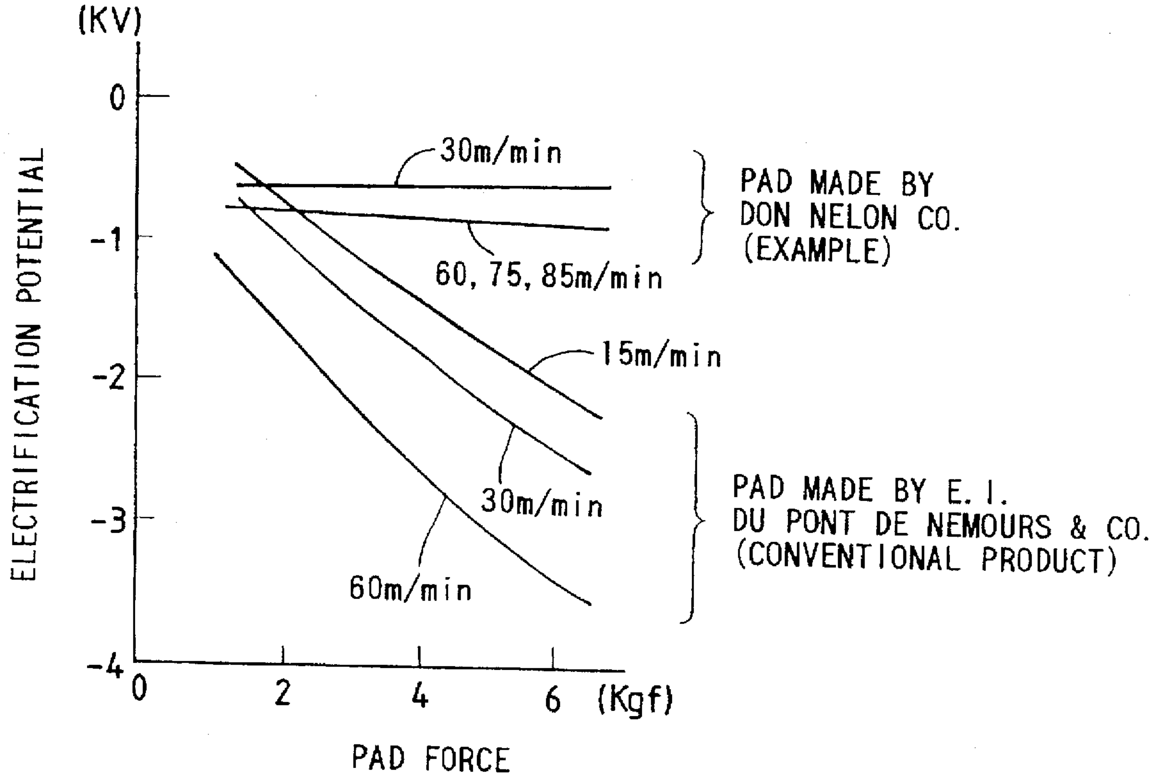
FIG. 10 shows experiments for showing a comparison between a roll rotation speed of an elastic rotary roll and force to an elastic pad.

The comparison in the case that the roll rotation speed of the elastic rotary roll **18*a* and the force to the elastic pad 13*a* were varied is shown in FIG. 10. As shown in this FIG. 10, in the case that the elastic pad 13*a* does not have an electroconductivity, the electrification potential increased as the pad force was high, or the rotation speed of the roll 18*a* was high. On the other hand, in the case that the elastic pad 13*a* having an electrical resistivity value within the range of from $10^{-3}$ to $10^6$ Ω·cm according to the present invention was used, the absolute value was less than 1 kV. Incidentally, the pad force (expressed by kgf) is one obtained by measuring the force of drawing a stainless steel plate 1*a* inserted between the elastic pad 13*a* and the elastic rotary roll 18*a* as shown in FIG. 9-(B). Further, the same experiment was carried out under the same conditions as those described above with respect to SA-7 (a trade name) [made by Toray Industries, Inc., quality: electroconductive non-woven fabric comprising carbon-containing fibers as a major component, electrical resistivity value: $10^2$ Ω·cm] and VLS6209F (a trade name) [made by Japan Vilene Company, Ltd., quality: electroconductive non-woven fabric comprising fibers having chemically formed polypyrrole as an electron-conjugated electroconductive polymer as a major component, electrical resistivity value: $10^1$ Ω·cm] as the elastic pad 13*a***. As a result, the same results as in Sandaron SS-N were obtained.

Also, the electrification potential is greatly influenced by the composition of the atmospheric gas, particularly the dew point. In the state in contact with an atmospheric gas composed mainly of a hydrogen gas having a dew point of about −50° C., the electrification quite easily occurs. However, it is already confirmed that in operating the actual devices using an electroconductive non-woven fabric having an electrical resistivity value of from $10^{-3}$ to $10^6$ Ω·cm, any problems do not occur.

POSSIBILITY IN INDUSTRY

As described above, since the sealing device of compartment gateways of continuous annealing furnaces, continuous painting equipments, and the like according to the present invention can prevent the generation of a static electricity in sealing portions, it is effective for preventing fires caused by a spark. The effect for preventing the static electricity by decreasing the electrical resistivity value of the elastic pad does not change even after the use over a long period of time as one month or longer. Further, the elastic pad is free from fluff, has a sufficient abrasion resistance, and is provided with longevity. Also, the control range of the electrical resistivity value of the elastic rotary roll can be made wider than that disclosed previously in the present applicant, and its practice is easy. In addition, no adverse influences are given at all to the sealing of the atmospheric gas and the strip for the original purpose of use, and strips having a high surface quality can be produced without a fear of fires. Accordingly, the industrial value of the present invention is very high.

I claim:

1. A sealing device of compartment gateways of continuous annealing furnaces and continuous painting equipments using an atmosphere having a danger of explosions or fires for metal strips, comprising: a sealing hardware, an elastic pad provided on a surface of the sealing hardware, a surface layer of which has an electrical resistivity value of from $10^{-3}$ to $10^6$ Ω·cm, and an elastic rotary roll pressed respectively against a metal strip and said elastic pad.

2. A sealing device of compartment gateways of continuous annealing furnaces and continuous painting equipments, as claimed in claim 1, wherein said elastic rotary roll (18) has an elasticity value according to JIS K6301 of from 40° to 90° and an electrical resistivity value of from 1 to $10^{13}$ Ω·cm.

3. A sealing device of compartment gateways of continuous annealing furnaces and continuous painting equipments as claimed in claim 1, wherein a surface layer portion of said elastic pad is an electroconductive non-woven fabric formed of a material selected from a group consisting of carbon-containing fibers alone and carbon-containing fibers as a major component.

4. A sealing device of compartment gateways of continuous annealing furnaces and continuous painting equipments as claimed in claim 1, wherein a surface layer portion of said elastic pad is an electroconductive non-woven fabric formed of a material selected from a group consisting of fibers having chemically formed polypyrrole as an electron-conjugated electroconductive polymer alone and fibers having chemically formed polypyrrole as an electron-conjugated electroconductive polymer as a major component.

5. A sealing device of compartment gateways of continuous annealing furnaces and continuous painting equipments as claimed in claim 1, wherein a surface layer portion of said elastic pad is an electroconductive non-woven fabric formed of a material selected from a group consisting of fibers made by treating acrylic fibers with a divalent copper compound and a sulfur-containing compound alone and fibers made by treating acrylic fibers with a divalent copper compound and a sulfur-containing compound as a major component.

6. A sealing device of a compartment gateway of a continuous annealing furnace and continuous painting equipment having a casing for treating a metal strip and using an atmosphere with a danger of fire, comprising:

sealing hardwares attached to the casing to be spaced apart from each other to allow the metal strip to pass therebetween and having outer surfaces facing outwardly from the casing, elastic pads provided on the outer surfaces of the sealing hardwares, a surface layer of each elastic pad having an electrical resistivity value of from $10^{-3}$ to $10^{6}$ Ω·cm to prevent generation of static electricity, and elastic rotary rolls disposed under the elastic pads, each of said elastic rotary rolls having an elasticity value according to JIS K6301 of from 40° to 90° and an electrical resistivity value of from 1 to $10^{13}$ Ω·cm, and being pressed against the metal strip and said elastic pad so that a gas in the casing is sealed and generation of static electricity is prevented.

* * * * *